(12) United States Patent
Terauchi

(10) Patent No.: US 11,870,087 B2
(45) Date of Patent: Jan. 9, 2024

(54) POWER SUPPLY DEVICE AND VEHICLE EQUIPPED WITH SAME

(71) Applicant: SANYO Electric Co., Ltd., Osaka (JP)

(72) Inventor: Shinobu Terauchi, Hyogo (JP)

(73) Assignee: SANYO Electric Co., Ltd., Osaka (JP)

(*) Notice: Subject to any disclaimer, the term of this patent is extended or adjusted under 35 U.S.C. 154(b) by 416 days.

(21) Appl. No.: 17/262,251

(22) PCT Filed: Jul. 26, 2019

(86) PCT No.: PCT/JP2019/029337
§ 371 (c)(1),
(2) Date: Jan. 22, 2021

(87) PCT Pub. No.: WO2020/026962
PCT Pub. Date: Feb. 6, 2020

(65) Prior Publication Data
US 2021/0351472 A1 Nov. 11, 2021

(30) Foreign Application Priority Data
Jul. 31, 2018 (JP) .................................. 2018-144244

(51) Int. Cl.
*B60K 1/04* (2019.01)
*H01M 50/209* (2021.01)
(Continued)

(52) U.S. Cl.
CPC ............. *H01M 50/209* (2021.01); *B60K 1/04* (2013.01); *H01M 50/249* (2021.01); *H01M 50/264* (2021.01); *H01M 2220/20* (2013.01)

(58) Field of Classification Search
CPC ............. H01M 50/209; H01M 50/264; H01M 2220/20; H01M 50/289; H01M 10/0481; B60K 1/04
See application file for complete search history.

(56) References Cited

U.S. PATENT DOCUMENTS 5,766,801 A 6/1998 Inoue et al.
9,537,125 B2 * 1/2017 Park .................. H01M 50/271
(Continued)

FOREIGN PATENT DOCUMENTS

CN 107710449 A 2/2018
EP 3300136 A1 3/2018
(Continued)

OTHER PUBLICATIONS

English Translation of Chinese Search Report dated Jul. 21, 2022, issued in counterpart CN application No. 201980051021.7. (2 pages).

(Continued)

*Primary Examiner* — Jason D Shanske
*Assistant Examiner* — James J Triggs
(74) *Attorney, Agent, or Firm* — WHDA, LLP

(57) ABSTRACT

Power supply device includes a plurality of secondary battery cells having a flat rectangular parallelepiped shape, a pair of end plates covering both end faces of battery stack having the plurality of secondary battery cells stacked on each other, and a plurality of fastening members for fastening end plates to each other. Each of the plurality of fastening members has a plate shape extending along the stacking direction of the plurality of secondary battery cells and is disposed on a corresponding one of opposite surfaces of battery stack. Through holes are formed in both ends of each plate shape. Each of the pair of end plates includes pipe portions inserted into the through holes of a pair of fastening members disposed on opposite surfaces of battery stack among the plurality of fastening members.

8 Claims, 14 Drawing Sheets

(51) Int. Cl.
*H01M 50/264* (2021.01)
*H01M 50/249* (2021.01)

(56) References Cited

U.S. PATENT DOCUMENTS

| | | | |
|---|---|---|---|
| 10,644,283 B2* | 5/2020 | Sakurai | H01M 10/0481 |
| 2006/0128230 A1* | 6/2006 | Korczynski | H01R 9/2491 |
| | | | 439/723 |
| 2013/0183571 A1 | 7/2013 | Miyazaki et al. | |
| 2018/0151908 A1 | 5/2018 | An et al. | |

FOREIGN PATENT DOCUMENTS

| | | |
|---|---|---|
| JP | 9-120808 | 5/1997 |
| JP | 2008-300083 A | 12/2008 |
| WO | 2012/043594 A1 | 4/2012 |
| WO | 2014/024426 A1 | 2/2014 |

OTHER PUBLICATIONS

International Search Report of PCT application No. PCT/JP2019/029337 dated Oct. 29, 2019.
The Extended European Search Report dated Jul. 26, 2021 for the related European Patent Application No. 19843346.8.

* cited by examiner

POWER SUPPLY DEVICE AND VEHICLE EQUIPPED WITH SAME

CROSS-REFERENCE TO RELATED APPLICATIONS

This application is a U.S. national stage application of the PCT International Application No. PCT/JP2019/029337 filed on Jul. 26, 2019, which claims the benefit of foreign priority of Japanese patent application No. 2018-144244, filed on Jul. 31, 2018, the contents all of which are incorporated herein by reference.

TECHNICAL FIELD

The present invention relates to a power supply device and a vehicle equipped with the power supply device.

BACKGROUND ART

The power supply device is used as a power supply device for driving a vehicle, a power supply device for storing electricity, and the like. In such a power supply device, a plurality of rechargeable secondary battery cells are stacked. In general, as illustrated in the perspective view of FIG. 15, power supply device 900 has end plates 920 on both end faces of a battery stack obtained by stacking secondary battery cells 901 having square package cans. End plates 920 are fastened to each other with metal bind bars 930.

The package can of a secondary battery cell expands and contracts when charging and discharging are repeated. In particular, with the recent demand for higher capacity, the capacity of each secondary battery cell is increasing. As a result, the amount of expansion tends to increase. At the time of expansion, a strong load is applied to a battery stack in which a large number of such secondary battery cells are stacked and fastened. As a result, it is possible that screws fixing the bind bars are broken.

CITATION LIST

Patent Literature

PTL 1: Unexamined Japanese Patent Publication No. 9-120808

SUMMARY OF THE INVENTION

The present invention has been made in view of such a background, and one of the purposes of the present invention is to provide a power supply device capable of stably maintaining the fastening of a battery stack in which a plurality of secondary battery cells are stacked and a vehicle including the power supply device.

A power supply device according to a certain aspect of the present invention includes a plurality of secondary battery cells each having a flat rectangular parallelepiped shape, a pair of end plates covering both end faces of a battery stack in which the plurality of secondary battery cells stacked, and a plurality of fastening members for fastening the end plates to each other. Each of the plurality of fastening members has a plate shape extending along the stacking direction of the plurality of secondary battery cells and is disposed on a corresponding one of opposite surfaces of the battery stack. Through holes are formed in both ends of each plate shape. Each of the pair of end plates includes pipe portions inserted into the through holes of a pair of fastening members disposed on opposite surfaces of the battery stack among the plurality of fastening members.

According to the above configuration, the pipe portions receive a stress over wide areas to avoid the concentration of the stress and disperse the stress, thereby improving durability and holding the fastening force of the battery stack stably for a long period of time.

DESCRIPTION OF EMBODIMENTS

Figure 1:
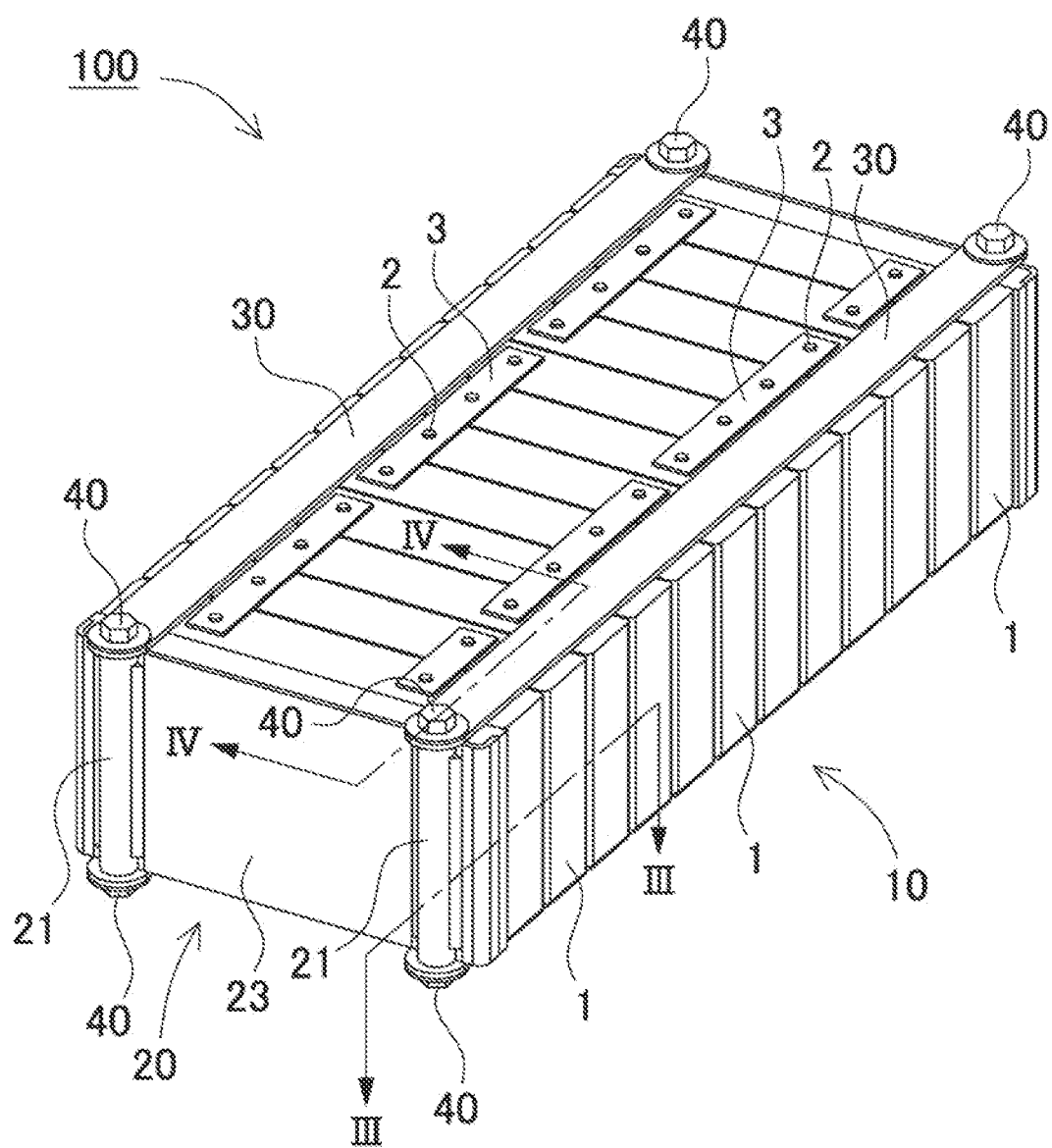
FIG. 1 is a perspective view illustrating a power supply device according to a first exemplary embodiment.

One point of interest of the present invention will be described first. A metal is used for each bind bar provided for the power supply device exemplified in PTL 1 so as to be able to withstand a relatively strong load. A metal differs in strength depending on how it receives a load, such as bending strength and tensile strength. A typical metal used as a material for each bind bar has excellent tensile strength and is characterized in that the deformation of the bind bar can be suppressed. However, a load in the shearing direction is applied to a screw fixing each bind bar, and the screw may break. On the other hand, in recent years, the amount of expansion has been increasing with the improvement of the performance of a secondary battery cell. Therefore, in the configuration exemplified in PTL 1, even if the deformation of each bind bar can be prevented, it may not be possible to prevent each screw from breaking. In recent years, such a configuration is less adopted. In consideration of these circumstances, the present inventors have studied a power supply device configured to effectively utilize the tensile strength of each bind bar, and as a result, have conceived a power supply device with a new configuration that can reduce the load on the fastening member that fixes each bind bar.

A power supply device according to an exemplary embodiment of the present invention includes a plurality of secondary battery cells having a flat rectangular parallelepiped shape, a pair of end plates covering both end faces of a battery stack in which the plurality of secondary battery cells are stacked, and a plurality of fastening members for fastening the end plates to each other. Each of the plurality of fastening members has a plate shape extending along the stacking direction of the plurality of secondary battery cells and is disposed on a corresponding one of opposite surfaces of the battery stack. Through holes are formed in both ends of each plate shape. Each of the pair of end plates includes pipe portions inserted into the through holes of a pair of fastening members disposed on opposite surfaces of the battery stack among the plurality of fastening members.

Further, in a power supply device according to another exemplary embodiment of the present invention, each of the pair of end plates includes a plate portion having a recess that receives the pipe portion.

In the power supply device according to an exemplary embodiment of the present invention, each of the plurality of secondary battery cells includes a package can having an opening and a sealing plate for sealing the opening of the package can. At least one of the plurality of fastening members is disposed on the surface of the sealing plate among the surfaces constituting the battery stack. With the above configuration, the sealing plate can be pressed by the fastening member.

In the power supply device according to another exemplary embodiment of the present invention, the pipe portion has pipe holes in both end edges of the pipe portion. The power supply device further has flange bolts inserted into the through holes and the pipe holes. The flange bolt has a flange having a larger diameter than the through hole. With the above configuration, a fastening member can be fixed to an end plate while the fastening force is easily adjusted by screwing.

In the power supply device according to another exemplary embodiment of the present invention, the pipe portion has pipe holes in both end edges of the pipe portion. The power supply device further has press-fit pins press fitted into the through holes and the pipe holes. The press-fit pin has a flange having a larger diameter than the through hole. The above configuration has an advantage of easily fixing a fastening member to the end plate without using screws.

The outer shape of the pipe portion may be cylindrical, and the recess may be formed in a curved shape according to the side surface of the pipe portion. With the above configuration, the stress applied to the fastening member is received through the curved surfaces of the pipe portion and the plate portion to alleviate the stress concentration, and is dispersed in the plate portion, thereby stably holding and improving reliability.

Further, the plate portion may be formed in a size capable of covering the secondary battery cell, and the recesses may be formed at right and left symmetrical positions of the plate portion.

The plate portion and the pipe portion may be welded.

A vehicle according to another exemplary embodiment of the present invention includes the power supply device, a running motor to which power is supplied from the power supply device, a vehicle body equipped with the power supply device and the motor, and wheels that are driven by the motor to run the vehicle body.

Exemplary embodiments of the present invention will be described with reference to the accompanying drawings. However, the exemplary embodiments described below are examples for embodying the technical idea of the present invention, and the present invention is not specified as the following. This specification does not specify the members described in the claims as the members of the exemplary embodiments. In particular, the dimensions, materials, shapes, relative arrangements, and the like of the components described in the exemplary embodiments are not intended to limit the scope of the present invention to that alone, and are merely explanatory examples unless otherwise specified. The sizes of the members and the positional relationship between the members illustrated in each drawing may be exaggerated to clarify the explanation. In the following description, the same names and reference numerals denote the same members or members having the same quality, and a detailed description of them will be omitted as appropriate. Further, each element constituting the present invention may be configured such that a plurality of elements are composed of the same member and one member serves as a plurality of elements, or conversely, the function of one member can be implemented by a plurality of members in a shared manner.

The power supply device according to the exemplary embodiment is used for various purposes such as a power supply mounted on an electric vehicle such as a hybrid vehicle or an electric vehicle to supply electric power to a running motor, a power supply for storing generated power of natural energy such as solar power generation or wind power generation, and a power supply for storing midnight power, and is particularly suitable as a power supply suitable for high power and high current applications.

First Exemplary Embodiment

Figure 2:
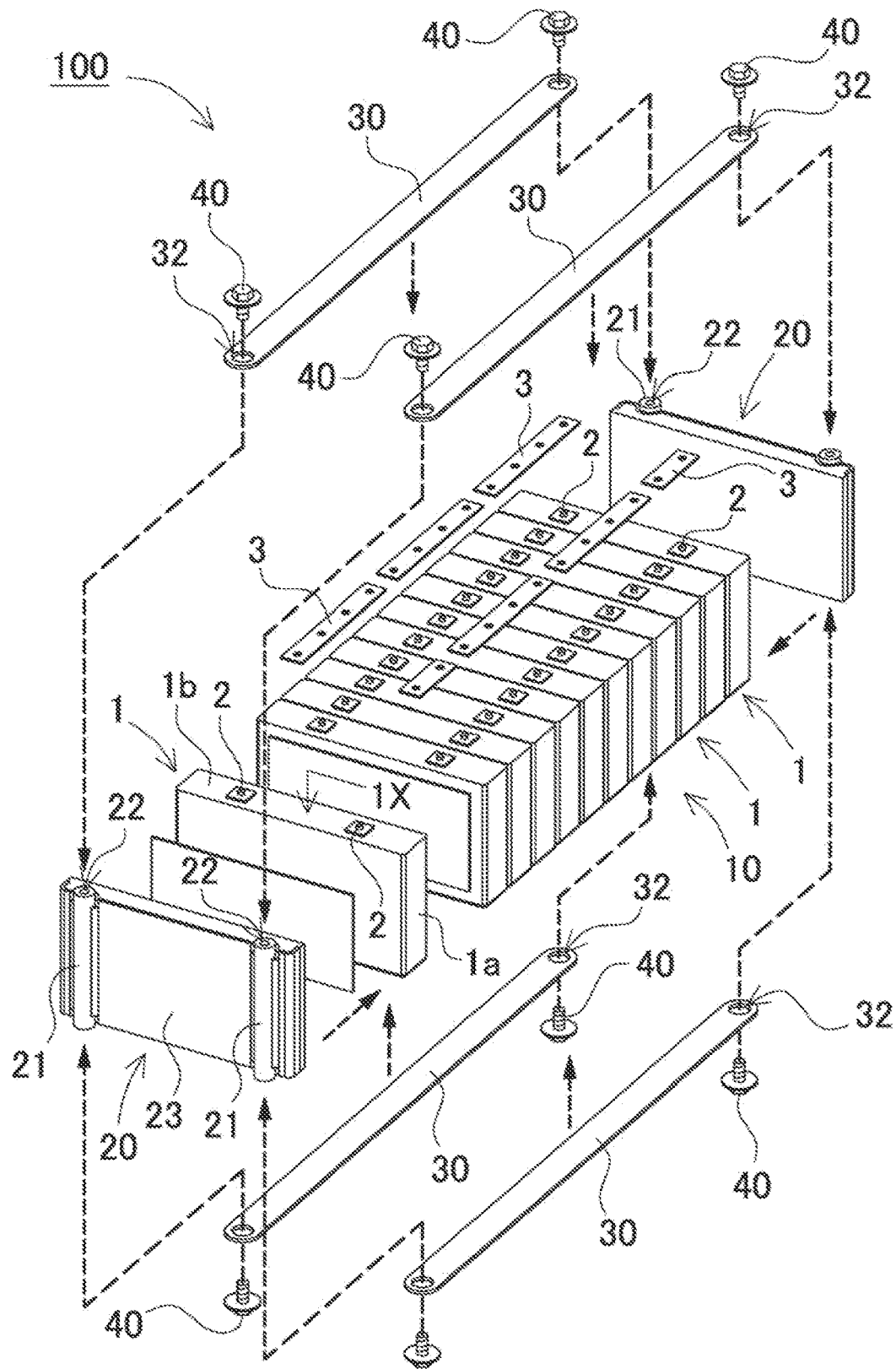
FIG. 2 is an exploded perspective view of the power supply device in FIG. 1.
Figure 3:
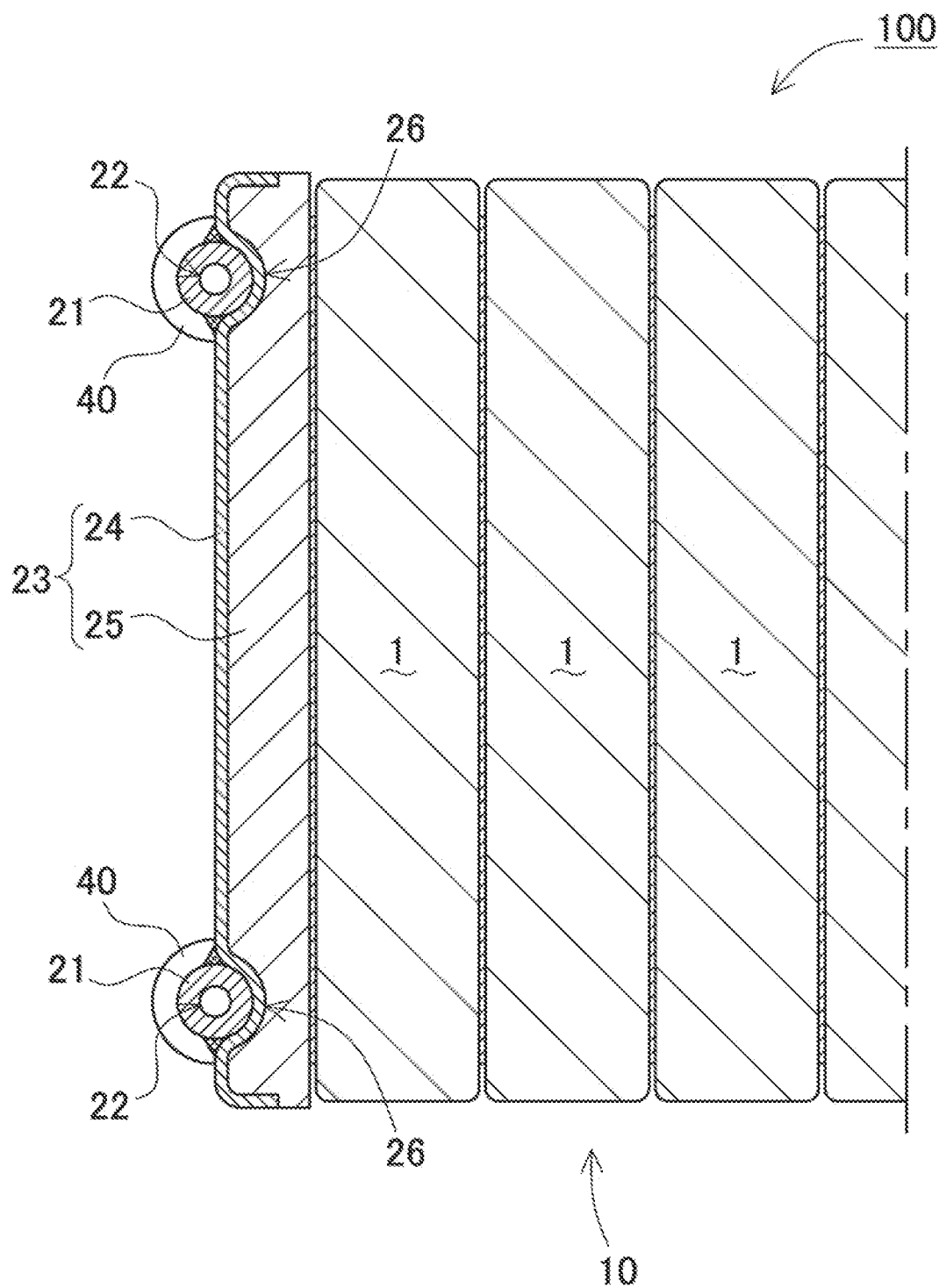
FIG. 3 is a horizontal cross-sectional view taken along line III-III of FIG. 1.
Figure 4:
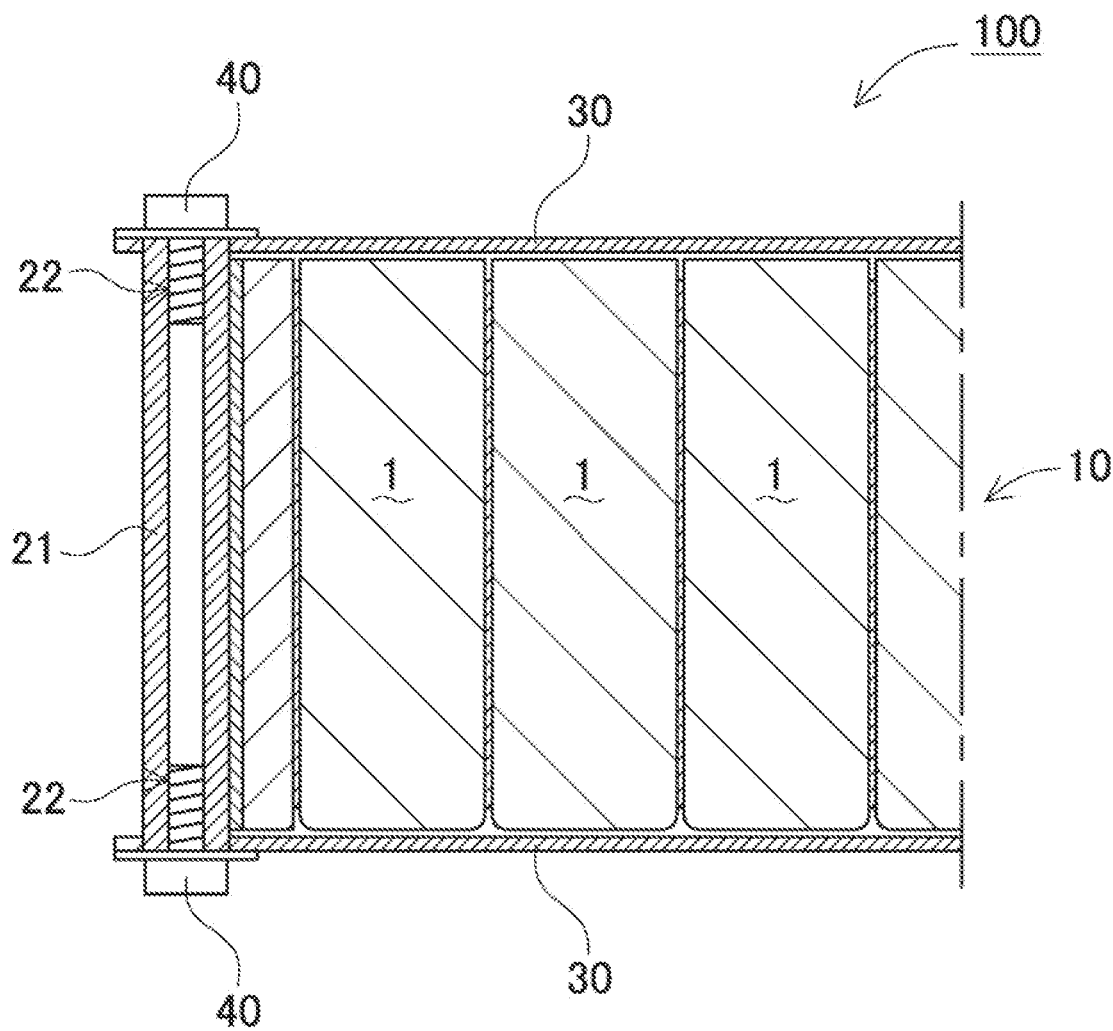
FIG. 4 is a vertical cross-sectional view taken along line IV-IV of FIG. 1.

FIG. 1 is a perspective view of power supply device 100 according to a first exemplary embodiment of the present invention, FIG. 2 is an exploded perspective view of power supply device 100, FIG. 3 is a horizontal cross-sectional view taken along line III-III in FIG. 1, and FIG. 4 is a vertical cross-sectional view taken along line IV-IV in FIG. 1. power supply device 100 illustrated in FIGS. 1 to 4 includes a plurality of secondary battery cells 1 having positive and negative electrode terminals 2 and bus bars 3 that are connected to electrode terminals 2 of the plurality of secondary battery cells 1 and connect the plurality of secondary battery cells 1 in parallel and in series. The plurality of secondary battery cells 1 are connected in parallel or in series via bus bars 3. Secondary battery cell 1 is a rechargeable secondary battery. In power supply device 100, the plurality of secondary battery cells 1 are connected in parallel to form a parallel battery group, and a plurality of parallel battery groups are connected in series so that a large number of secondary battery cells 1 are connected in parallel and in series. In power supply device 100 illustrated in FIGS. 1 and 2, the plurality of secondary battery cells 1 are staked to form battery stack 10. Further, a pair of end plates 20 are arranged on both end faces of battery stack 10. The ends of fastening members 30 are fixed to end plates 20 to fix stacked secondary battery cells 1 to a pressurized state.

(Secondary Battery Cell 1)

Secondary battery cell 1 is a square battery whose wide main surface has a quadrangular outer shape and which is thinner than the width. Further, secondary battery cell 1 is a secondary battery that can be charged and discharged, and is a lithium ion secondary battery. However, the present invention does not specify the secondary battery cell as the square battery, nor specifies the secondary battery cell as the lithium ion secondary battery. As the secondary battery cell, all rechargeable batteries can be used, including, for example, a non-aqueous electrolyte secondary battery and a nickel water secondary battery cell other than the lithium ion secondary battery.

As illustrated in FIG. 2, in secondary battery cell 1, an electrode body obtained by stacking positive and negative electrode plates is housed in package can 1a which is filled with an electrolytic solution and airtightly sealed. Package can 1a is formed into a square cylinder that closes the bottom, and the upper opening is airtightly closed by sealing plate 1b formed from a metal plate. Package can 1a is formed by deep-drawing a metal plate such as aluminum or an aluminum alloy. Like package can 1a, sealing plate 1b is formed from a metal plate such as aluminum or an aluminum alloy. Sealing plate 1b is inserted into the opening of package can 1a, and the boundary between the outer periphery of sealing plate 1b and the inner periphery of package can 1a is irradiated with a laser beam to airtightly fix sealing plate 1b to package can 1a by laser welding.

(Electrode Terminal 2)

Secondary battery cell 1 has sealing plate 1b, which is the top surface, as terminal surface 1X. Positive and negative electrode terminals 2 are fixed to both ends of terminal surface 1X. Electrode terminal 2 has a columnar protruding portion. However, the protruding portion need not be necessarily be cylindrical, and may be polygonal or elliptical.

The positions of positive and negative electrode terminals 2 fixed to sealing plate 1b of secondary battery cell 1 are set such that the positive electrode and the negative electrode are symmetrical. As a result, secondary battery cells 1 are flipped horizontally and stacked, and positive and negative electrode terminals 2 that are adjacent and close to each other are connected through bus bars 3, so that adjacent secondary battery cells 1 can be connected in series.

(Battery Stack 10)

The plurality of secondary battery cells 1 are stacked to form battery stack 10 such that the thickness direction of each secondary battery cell 1 is the stacking direction. In battery stack 10, a plurality of secondary battery cells 1 are stacked such that terminal surface 1X provided with positive and negative electrode terminals 2 and sealing plate 1b in FIG. 2 are flush with each other.

Battery stack 10 may have an insulating spacer interposed between the secondary battery cells stacked adjacent to each other. The insulating spacer is made of an insulating material such as a resin and is formed in a thin plate shape or a sheet shape. The insulating spacer has a plate shape having a size almost equal to the facing surface of the secondary battery cell. The insulating spacers can be stacked between the secondary battery cells adjacent to each other to insulate the adjacent secondary battery cells from each other.

As a spacer disposed between the adjacent secondary battery cells, a spacer having a shape that forms a flow path of a cooling gas between the secondary battery cell and the spacer can also be used. Further, the surface of the secondary battery cell can be coated with an insulating material. For example, a shrink tube such as PET resin is heat-welded to the surface of the package can except for the electrode portions of the secondary battery cell. In this case, the insulating spacer may be omitted. Further, in a power supply device in which a plurality of secondary battery cells are connected in multiple parallel and multiple series, the secondary battery cells connected in series are insulated by interposing an insulating spacer between the secondary battery cells, whereas, because there is no voltage difference between the adjacent package cans of the secondary battery cells connected in parallel, the insulating spacer between the secondary battery cells can be omitted.

Further, in power supply device 100 illustrated in FIG. 2, end plates 20 are disposed on both end faces of battery stack 10. An end face spacer may be interposed between the end plate and the battery stack to insulate them. The insulating spacer is also made of an insulating material such as a resin and formed in a thin plate shape or a sheet shape.

In battery stack 10, metal bus bars 3 are connected to positive and negative electrode terminals 2 of adjacent secondary battery cells 1, and the plurality of secondary battery cells 1 are connected in parallel and in series via bus bars 3. In battery stack 10, a plurality of secondary battery cells 1 connected in parallel to each other to form parallel battery groups are stacked such that positive and negative electrode terminals 2 provided at both ends of each terminal surface 1X are located in the same direction laterally, whereas secondary battery cells 1 that form parallel battery groups connected in series to each other are stacked such that positive and negative electrode terminals 2 provided at both ends of terminal surfaces 1X are located in laterally opposite directions. Here, in power supply device 100 according to the first exemplary embodiment illustrated in FIGS. 1 to 2, twelve secondary battery cells 1 are laminated in the thickness direction to form a battery stack 10, and four secondary battery cells 1 are connected in parallel to form a parallel battery group, and three sets of parallel battery groups are connected in series to connect twelve secondary battery cells 1 in four parallel three series. Therefore, in battery stack 10 illustrated in FIG. 2, four secondary battery cells 1 constituting the parallel battery group are stacked so as to set positive and negative electrode terminals 2 in the same direction laterally, and three sets of parallel battery groups each constituted by four secondary battery cells 1 stacked in the same direction are stacked so as to set positive and negative electrode terminals 2 alternately in opposite directions. However, the present invention does not specify a number of secondary battery cells constituting the battery stack and the connection state of the battery cells. The number of secondary battery cells constituting the battery stack and the connection state of the battery cells can be variously changed as well as in other exemplary embodiments described later.

(Bus Bar 3)

In power supply device 100 according to the first exemplary embodiment, in battery stack 10 obtained by stacking a plurality of secondary battery cells 1 on each other, electrode terminals 2 of adjacent secondary battery cells 1 are connected to each other through bus bar 3, and the plurality of secondary battery cells 1 are connected in parallel and in series.

Bus bar 3 is manufactured by cutting and processing a metal plate into a predetermined shape. As a metal plate forming bus bar 3, a metal having a low electric resistance and a small weight, such as a plate made of an aluminum, copper plate, or their alloy, can be used. However, as a metal plate of bus bar 3, other metals or their alloys, which have a low electric resistance and a small weight, can also be used. Further, bus bar holders may be disposed between battery stack 10 and bus bars 3. A plurality of bus bars can be disposed at fixed positions on the upper surface of the battery stack while the plurality of bus bars are insulated from each other and the terminal surfaces of the secondary battery cells are insulated from the bus bars by using the bus holders.

(End Plate 20)

As illustrated in FIGS. 1 to 4, end plates 20 are disposed at both ends of battery stack 10 and are fastened via fastening members 30 disposed along both side surfaces of battery stack 10. End plates 20 are both ends of battery stack 10 in the stacking direction of secondary battery cell 1, and are disposed outside the end face spacers to sandwich battery stack 10 from both ends.

(Fastening Member 30)

Both ends of fastening member 30 are fixed to end plates 20 disposed on both end faces of battery stack 10. End plate 20 is fixed by a plurality of fastening members 30, and battery stack 10 is fastened in the stacking direction. Fastening members 30 are metal plates each having a predetermined width and a predetermined thickness along the upper surface of battery stack 10, and are disposed so as to face the upper and lower surfaces of battery stack 10. A metal plate such as an iron plate, preferably a steel plate, can be used for fastening member 30. Fastening member 30 made of a metal plate is bent by press molding or the like to form a predetermined shape.

Figure 15:
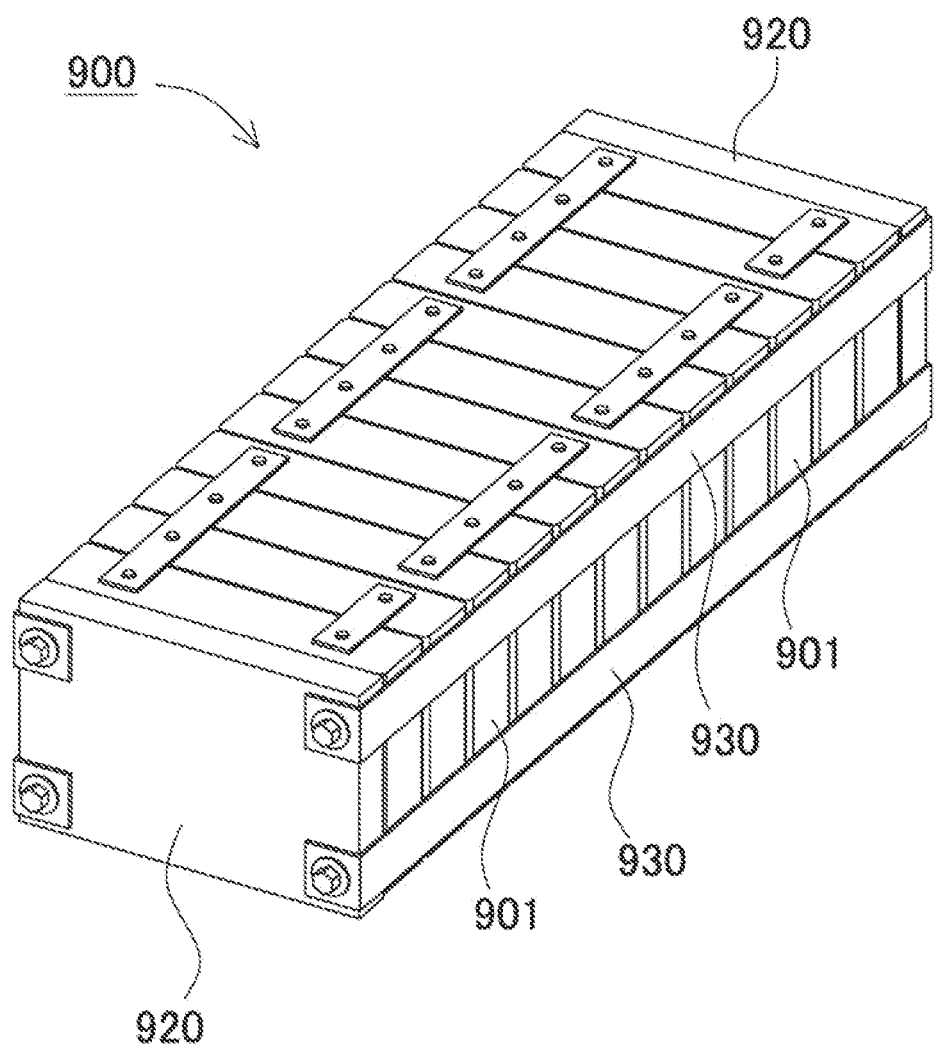
FIG. 15 is a perspective view illustrating a conventional power supply device.

As illustrated in FIGS. 1 to 4, fastening member 30 is formed in a plate shape extending in the stacking direction of battery stack 10. In other words, fastening member 30 is formed in the shape of a flat plate with no bent edges. By fixing the end edges of fastening members 30 having such a configuration to end plates 20, it is possible to increase the resistance to the shear stress generated when secondary battery cells 1 expand. That is, a channel shaped bent bind bar 930 used for conventional power supply device 900 illustrated in FIG. 15 may be broken at a bent portion because the shear stress is likely to be concentrated on the bent portion. Accordingly, by forming fastening member 30 in a flat plate shape without providing such a bent portion, it is possible to avoid the occurrence of a portion where the stress is likely to be concentrated and to receive the stress by entire fastening member 30, thereby improving the resistance.

(Through Hole 32)

Through holes 32 are formed in both ends of plate-shaped fastening member 30. Fastening members 30 are disposed on opposite surfaces of battery stack 10, and through holes 32 are disposed coaxially.

The fastening member having the above structure does not have a processed portion such as a portion formed by bending that increases the dimensional tolerance, and hence can be molded with high dimensional accuracy. Accordingly, when assembling the power supply device, making holes for forming through holes 32 in accordance with the dimensions of the battery stack pressurized at a predetermined pressure can reduce variations in compressive force applied from the fastening members.

On the other hand, end plate 20 is composed of pipe portions 21 and plate portion 23. Pipe portion 21 has a pipe hole 22 in the end edge. As illustrated in the vertical cross-sectional view of FIG. 4, pipe hole 22 can be a through hole extending through pipe portion 21. This makes it possible to form pipe portion 21 into a hollow pipe to reduce the weight and cost. Alternatively, the pipe portion may be formed into a solid columnar shape, and pipe holes may be formed in the end faces at a constant depth. By using a solid pipe portion, the strength of the pipe portion can be increased and the rigidity against stress can be increased.

(Plate Portion 23)

As illustrated in the horizontal cross-sectional view of FIG. 3, plate portion 23 has recesses 26 for receiving pipe portions 21 on the right and left. Plate portion 23 has the pair of pipe portions 21 coupled to right and left recesses 26, respectively. In this state, pipe hole 22 of pipe portion 21 is fixed so as to coincide with through hole 32 of fastening member 30. With this configuration, the stress received by pipe portion 21 is transmitted to plate portion 23, so that the stress can be dispersed by being received over a wide area. That is, by avoiding the concentration of the stress, the rigidity can be increased, the durability can be improved, and the fastening force of battery stack 10 can be stably maintained for a long period of time. In particular, as described above, making each fastening member 30 plate-shaped without any bent portion prevents the stress from concentrating on a specific portion of fastening member 30, such as a bent portion. In addition, making pipe portion 21 of end plate 20 fixed to fastening member 30 also receive the stress can prevent the occurrence of the shear stress and stably maintain the fastening force of battery stack 10 for a long period of time.

Fastening members 30 are disposed on opposite surfaces of battery stack 10. In the example illustrated in FIGS. 1 to 4, fastening members 30 are disposed on the upper and lower surfaces of battery stack 10. In this case, as illustrated in FIG. 1 and the like, fastening member 30 is displaced from the position of electrode terminal 2 of each secondary battery cell 1 so as to expose electrode terminal 2. Further, in this configuration, by disposing fastening member 30 on the surface of sealing plate 1b of secondary battery cell 1, fastening member 30 can press the upper surface of sealing plate 1b.

Plate portion 23 of end plate 20 has a quadrangular outer shape, and is disposed so as to face the end face of battery stack 10. Plate portion 23 illustrated in FIGS. 1 to 4 has an outer shape substantially equal to the outer shape of secondary battery cell 1. That is, plate portion 23 illustrated in FIGS. 1 to 4 has a width in the lateral direction substantially equal to the width of secondary battery cell 1 and a height in the vertical direction substantially equal to the height of secondary battery cell 1. In this specification, the vertical direction means the vertical direction in the accompanying drawings, and the lateral direction means the lateral direction in the accompanying drawings, which means the horizontal direction orthogonal to the stacking direction of the batteries.

(Pipe Portion 21)

On the other hand, pipe portion 21 is designed to have a length substantially equal to or slightly larger than the height of plate portion 23. Accordingly, pipe hole 22 in the end face of pipe portion 21 can be fixed to fastening member 30 so as to coincide with or slightly protrude from the upper end of plate portion 23. If the through hole of the each fastening member is made larger than the outer shape of the pipe portion, the pipe portion can be easily inserted through the through hole. However, from the viewpoint of strength, the outer shape of the pipe portion is preferably nearly equal to the size of the through hole of the fastening member.

Pipe portion 21 preferably has a columnar outer shape. Further, recess 26 of plate portion 23 is formed in a curved shape in accordance with the columnar side surface of pipe portion 21. Forming concave portion 26 into a curved portion will enhance the effect of relaxing the stress concentration by receiving the stress applied to fastening member 30 through the curved surfaces of pipe portion 21 and plate portion 23. On the contrary, if pipe portion 21 is formed into a prismatic shape, the stress may concentrate on the bent portion of recess 26 of plate portion 23 that receives pipe portion 21. This may cause fracture. In contrast to this, by receiving the stress through curved surfaces, the dispersion effect is enhanced by avoiding the occurrence of such stress concentration points. This can improve the reliability.

(Pipe Hole 22)

Figure 5:
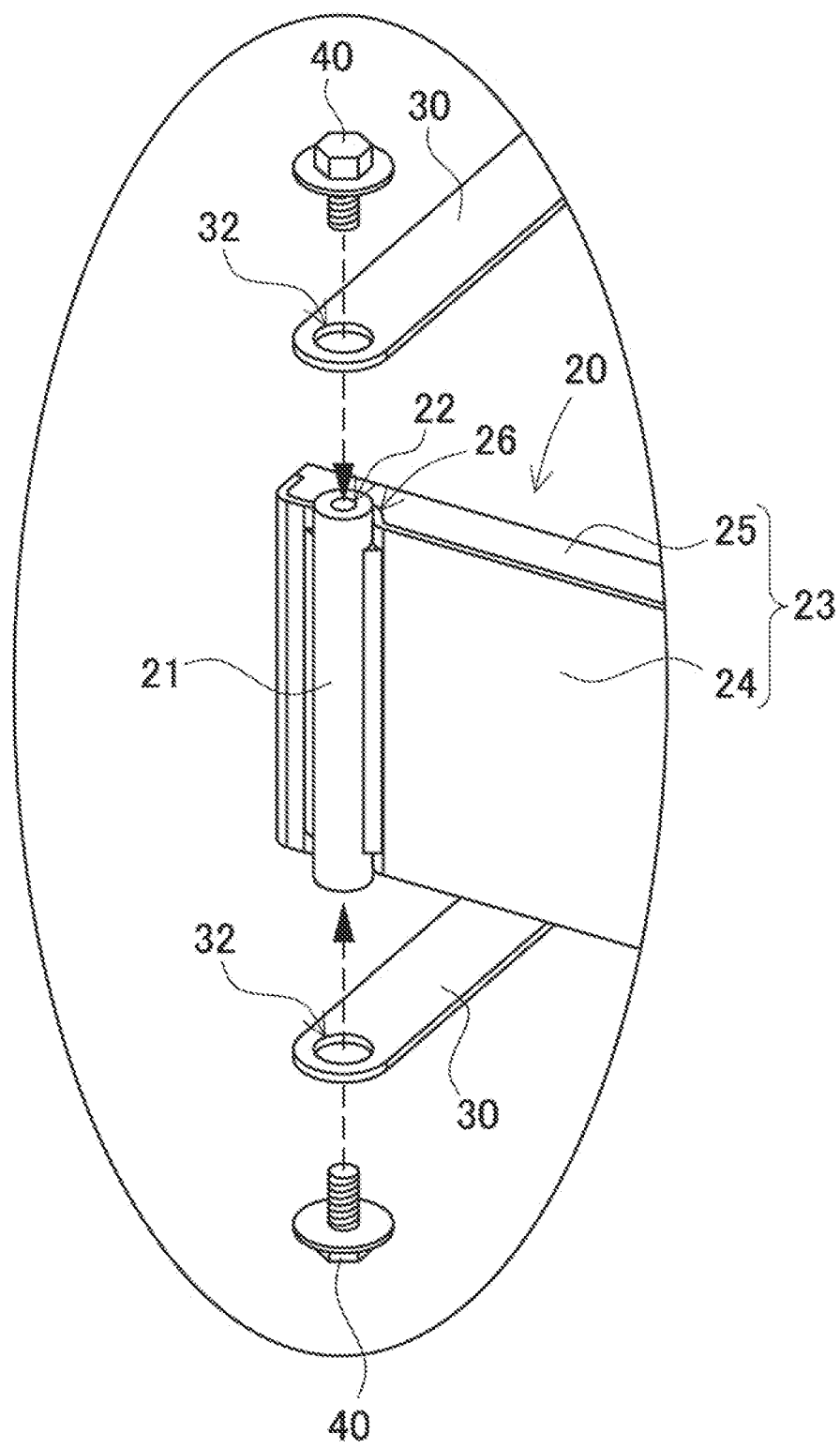
FIG. 5 is an exploded perspective view of an end plate of FIG. 1.

Pipe hole 22 formed in the end face of pipe portion 21 can be a screw hole having a thread groove on the inner surface. In the example illustrated in FIG. 5, fastening member 30 and pipe portion 21 are threadably engaged with each other with flange bolts 40 that threadably engages through hole 32 with pipe hole 22. Using such threadable engagement can fix fastening member 30 to end plate 20 while easily adjusting the fastening force.

Second Exemplary Embodiment

Figure 6:
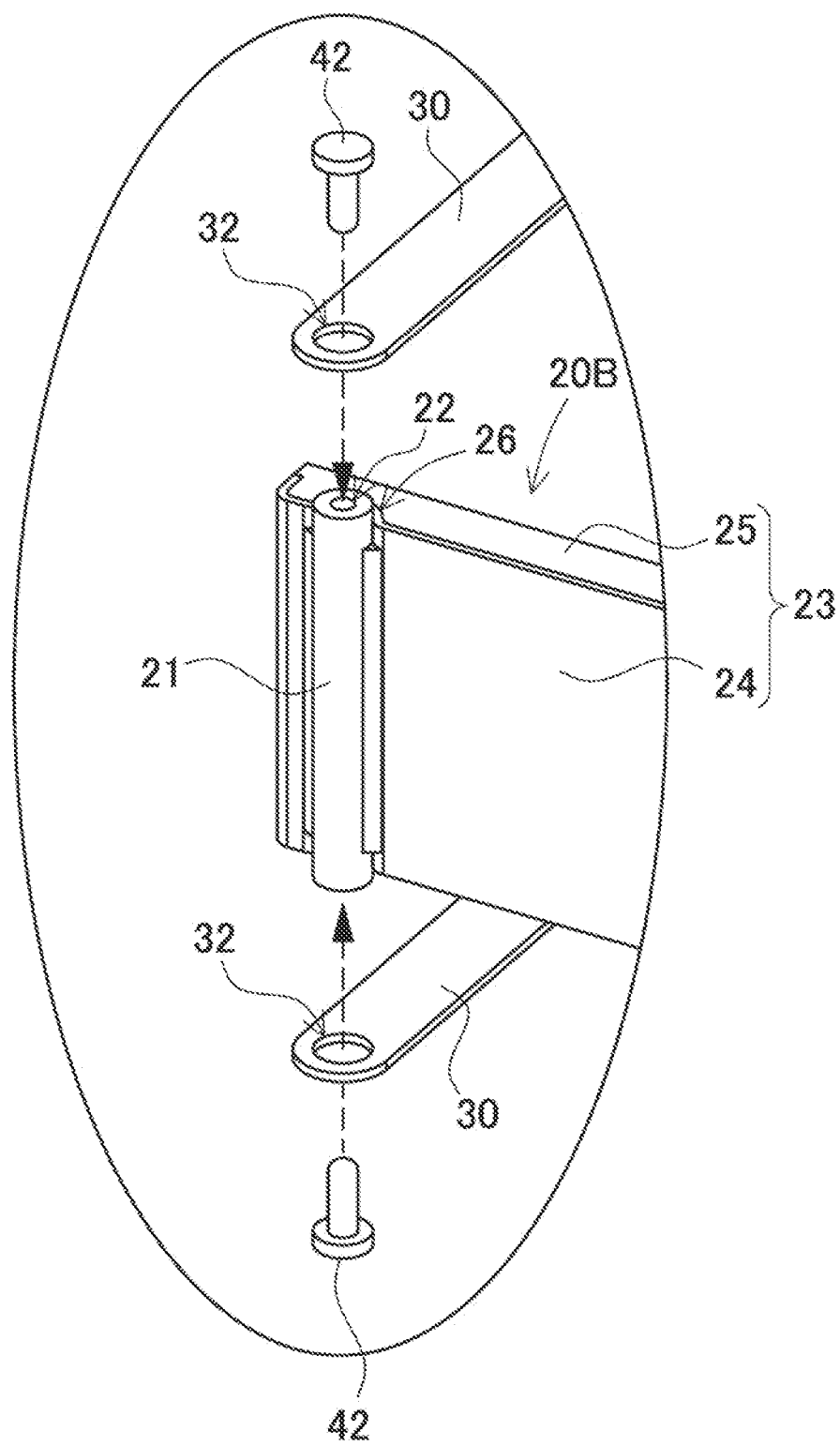
FIG. 6 is a perspective view of a power supply device according to a second exemplary embodiment.

However, the present invention does not limit the fixing structure of the fastening member and pipe portion 21 to threadable engagement. For example, pins or rivets can be press-fitted, swaged, welded, or the like. For example, in the power supply device illustrated in FIG. 6 as a second exemplary embodiment, press-fit pin 42 is fixed by being driven into through hole 32 and pipe hole 22. This makes it possible to fix fastening member 30 to end plate 20B in a process simpler than threadable engagement.

Through hole 32 may have the same size as the outer diameter of cylindrical pipe portion 21. In this case, fastening member 30 and the upper surface of pipe portion 21 are designed to be flush with each other with pipe portion 21 inserted in through hole 32. For example, the length of pipe portion 21 is designed to be larger than the height of plate portion 23 by the thickness of two fastening members 30. This makes it possible to firmly fix pipe portion 21 and fastening members 30 to each other by inserting the top and bottom of pipe portion 21 into holes 32, making the end faces of pipe portion 21 flush with fastening members 30, and fixing flange bolts 40 or press-fit pins 42 to pipe hole 22.

It is preferable that plate portion 23 and pipe portion 21 are fixed in advance. In the example illustrated in FIG. 5, plate portion 23 and pipe portion 21 are welded. MIG welding or the like can be used for welding.

Third Exemplary Embodiment

Figure 7:
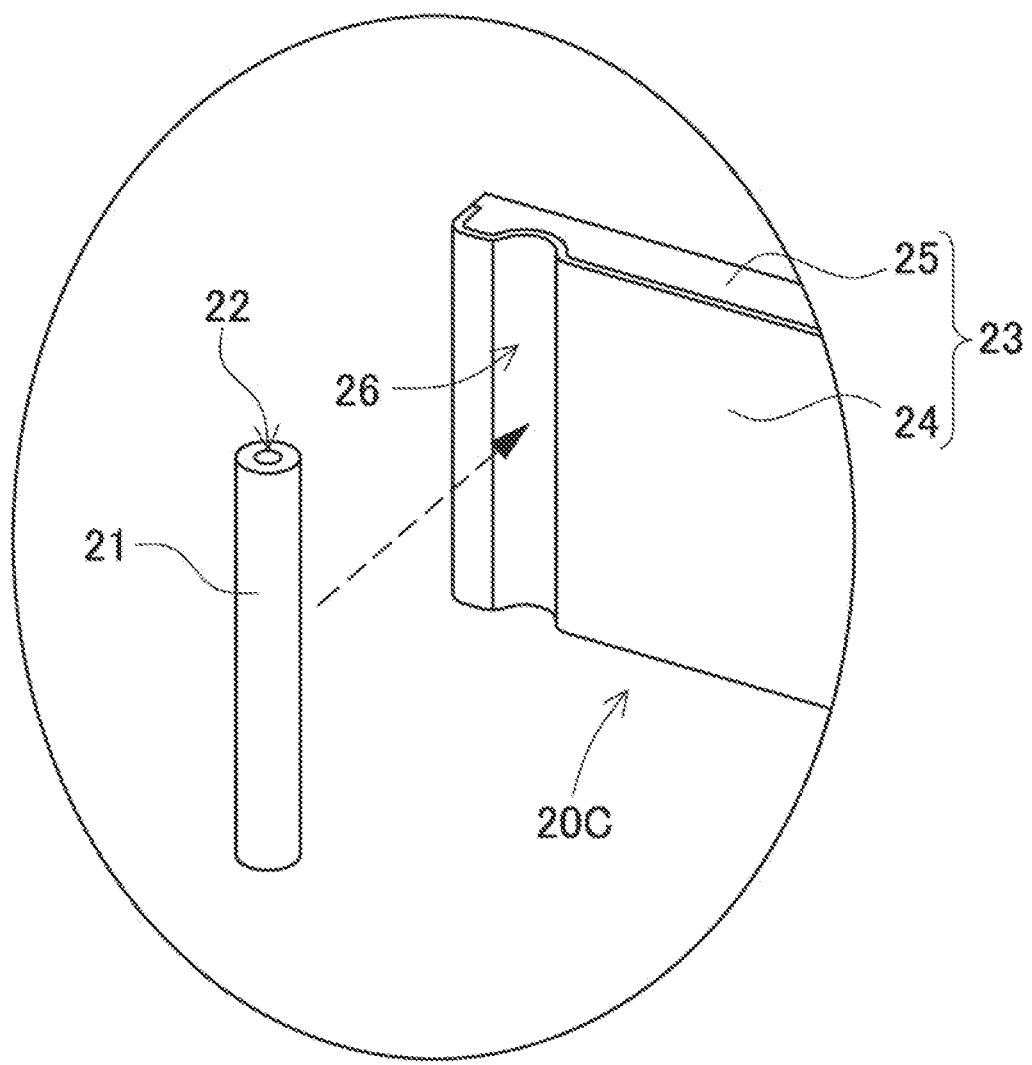
FIG. 7 is an exploded perspective view of an end plate of a power supply device according to a third exemplary embodiment.

However, plate portions 23 and the pipe portions need not always be fixed to each other. For example, according to a third exemplary embodiment, pipe portion 21 may be coupled to recess 26 as in the case of end plate 20C of the power supply device illustrated in the exploded perspective view of FIG. 7. Fixing pipe portions 21 to fastening members 30 will inevitably clamp plate portions 23 with pipe portions 21 from both the right and left sides of the battery stack, thereby firmly coupling pipe portions 21 and plate portions 23.

Fourth Exemplary Embodiment

Figure 8:
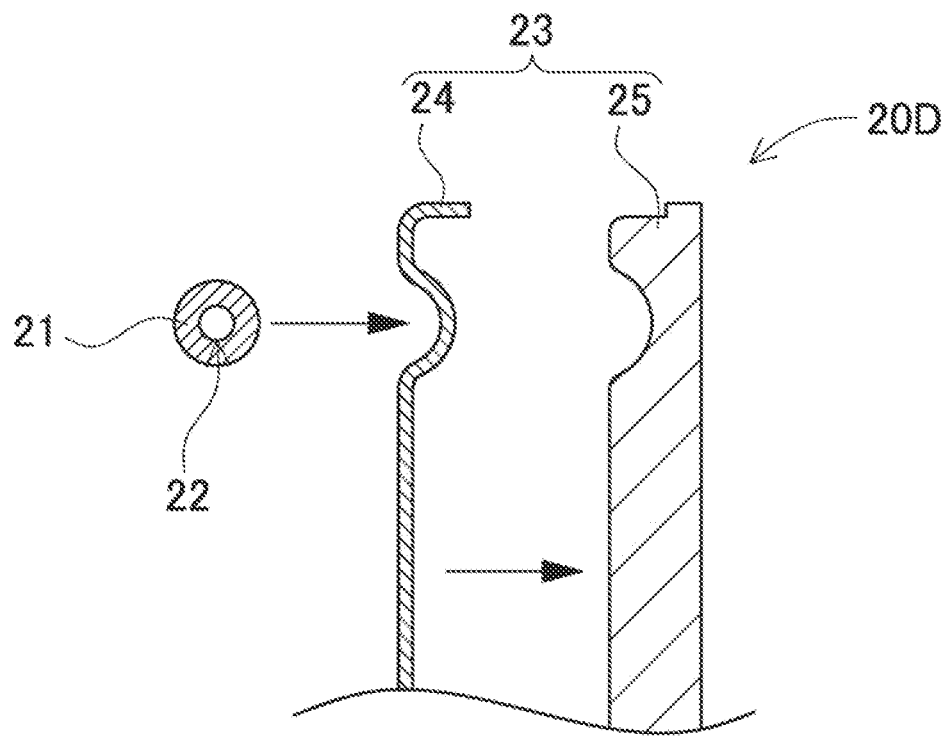
FIG. 8 is an exploded horizontal cross-sectional view of an end plate of a power supply device according to a fourth exemplary embodiment.

Plate portion 23 is formed by combining first plate 24 obtained by bending a metal plate and second plate 25 which has a flat plate shape thicker than first plate 24 and has recess 26 formed in one surface. Both first plate 24 and second plate 25 can be formed by press molding or the like. Alternatively, second plate 25 may be formed by cutting, casting, or the like. First plate 24 and second plate 25 are made of highly rigid metal such as steel use stainless (SUS) or iron. Further, it is preferable that first plate 24 and second plate 25 are previously joined and fixed. However, first plate 24 and second plate 25 may not be fixed and may be coupled to each other by being fixed to fastening member 30 as described above as in the case of end plate 20D according to a fourth exemplary embodiment illustrated in FIG. 8.

Fifth Exemplary Embodiment

Figure 9:
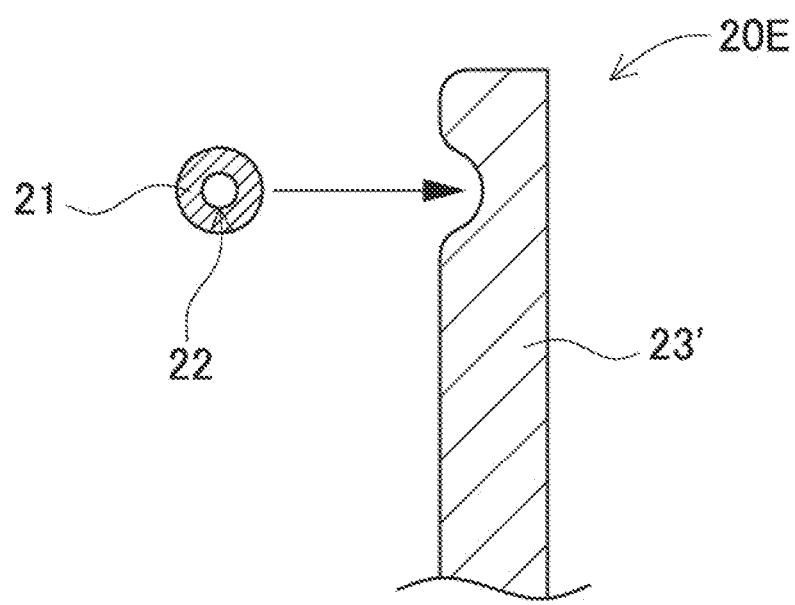
FIG. 9 is an exploded plan view of an end plate according to a fifth exemplary embodiment.

Each plate portion may be integrally formed in advance without being divided into the first plate and the second plate. FIG. 9 illustrates such an example as plate portion 23' of a power supply device according to a fifth exemplary embodiment. Plate portion 23' of end plate 20E is made of a single metal plate, which has the advantage of saving the trouble of joining the first plate and the second plate.

Sixth Exemplary Embodiment

Figure 10:
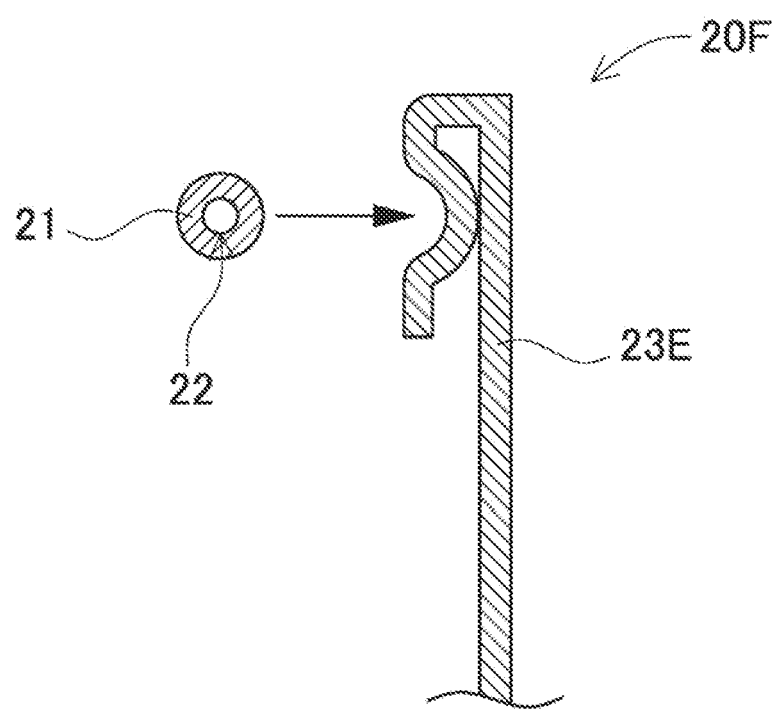
FIG. 10 is an exploded plan view of an end plate according to a sixth exemplary embodiment.

Each plate portion may be formed by bending a single metal plate. The cross-sectional view of FIG. 10 illustrates such an example as an end plate for a power supply device according to a sixth exemplary embodiment. Plate portion 23E can greatly reduce the weight of end plate 20F as compared with, for example, the first exemplary embodiment, and can also reduce the member cost. Further, end plate 20F can be easily deformed. Accordingly, when the secondary battery cell expands, end plate 20F itself deforms to absorb displacement due to the expansion.

The above end plate has a plurality of pipe portions 21 extending from the top to the bottom and fixed to fastening members 30. In the example illustrated in FIG. 1 and the like, pipe portions 21 are disposed on the right and left sides of plate portion 23, and the pair of pipe portions 21 are respectively fixed to fastening members 30. As a result, the stress at the time of expansion of the secondary battery cell is dispersed and received by right and left pipe portions 21, and is transmitted to plate portion 23, thereby counteracting the stress over a wide area. Preferably, recesses 26 are formed at symmetrical positions on the right and left of plate portion 23. As a result, the stress received by right and left pipe portions 21 can be evenly dispersed by plate portion 23, thereby allowing the plate portion to exhibit resistance characteristics in a well-balanced manner.

Seventh Exemplary Embodiment

Figure 11:
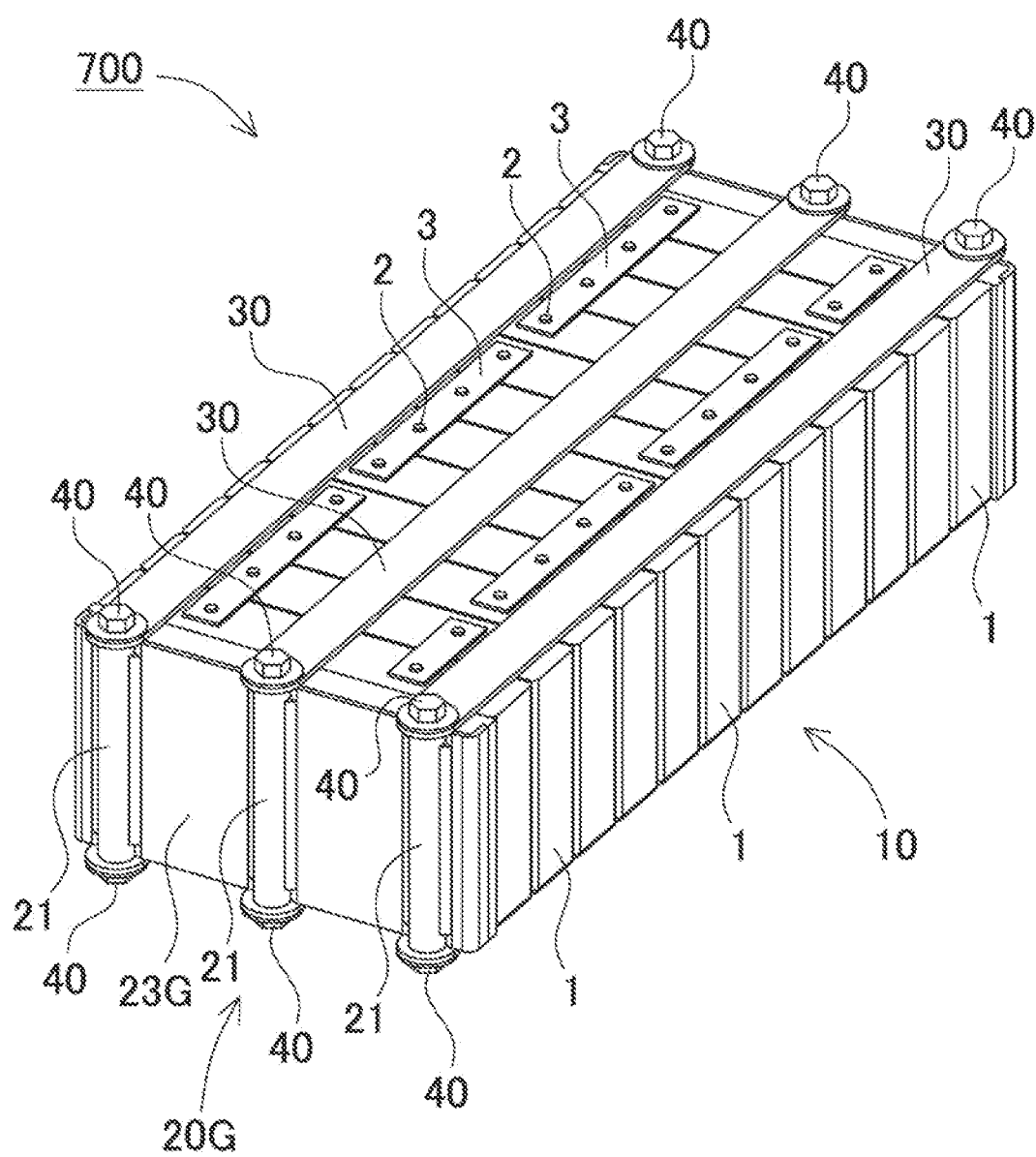
FIG. 11 is a perspective view of a power supply device according to a seventh exemplary embodiment.

In the above example, two pipe portions 21 are provided on each end plate 20 and fastened to each of the upper and lower surfaces of battery stack 10 with two fastening members 30. However, the present invention is not limited to this configuration, and three or more pipe portions and fastening members may be disposed. As an example, power supply device 700 according to a seventh exemplary embodiment is illustrated in the perspective view of FIG. 11. End plate 20G illustrated in FIG. 11 has three pipe portions 21 and three fastening members 30 disposed on plate portion 23G. By increasing a number of fastening members in this way, the fastening force of the battery stack can be further increased. In addition to increasing the number of fastening members, the fastening force can be adjusted by changing the width of the fastening members. However, if the number of fastening members or the width increases, the area covering the sealing plate of the secondary battery cell increases, which may hinder the exposure of the electrode terminals provided on the sealing plate. Therefore, the number, width, and placement positions of fastening members 30 are adjusted in accordance with the capacity of the secondary battery cell, the expected expansion amount, the required fastening force, and the positions of the electrode terminals.

The above power supply device can be used as a vehicle-mounted power supply. As a vehicle equipped with a power supply device, an electrically driven vehicle such as a hybrid vehicle or a plug-in hybrid vehicle that runs on both an engine and a motor, or an electric vehicle that runs only on a motor can be used. The power supply device is used as a power supply for these vehicles. Large-capacity, high-output power supply device 100 will be exemplified, which is constructed by connecting a large number of power supply devices, each described above, in series or in parallel in order to obtain electric power for driving a vehicle and adding a necessary control circuit.

(Power Supply Device for Hybrid Vehicle)

Figure 12:
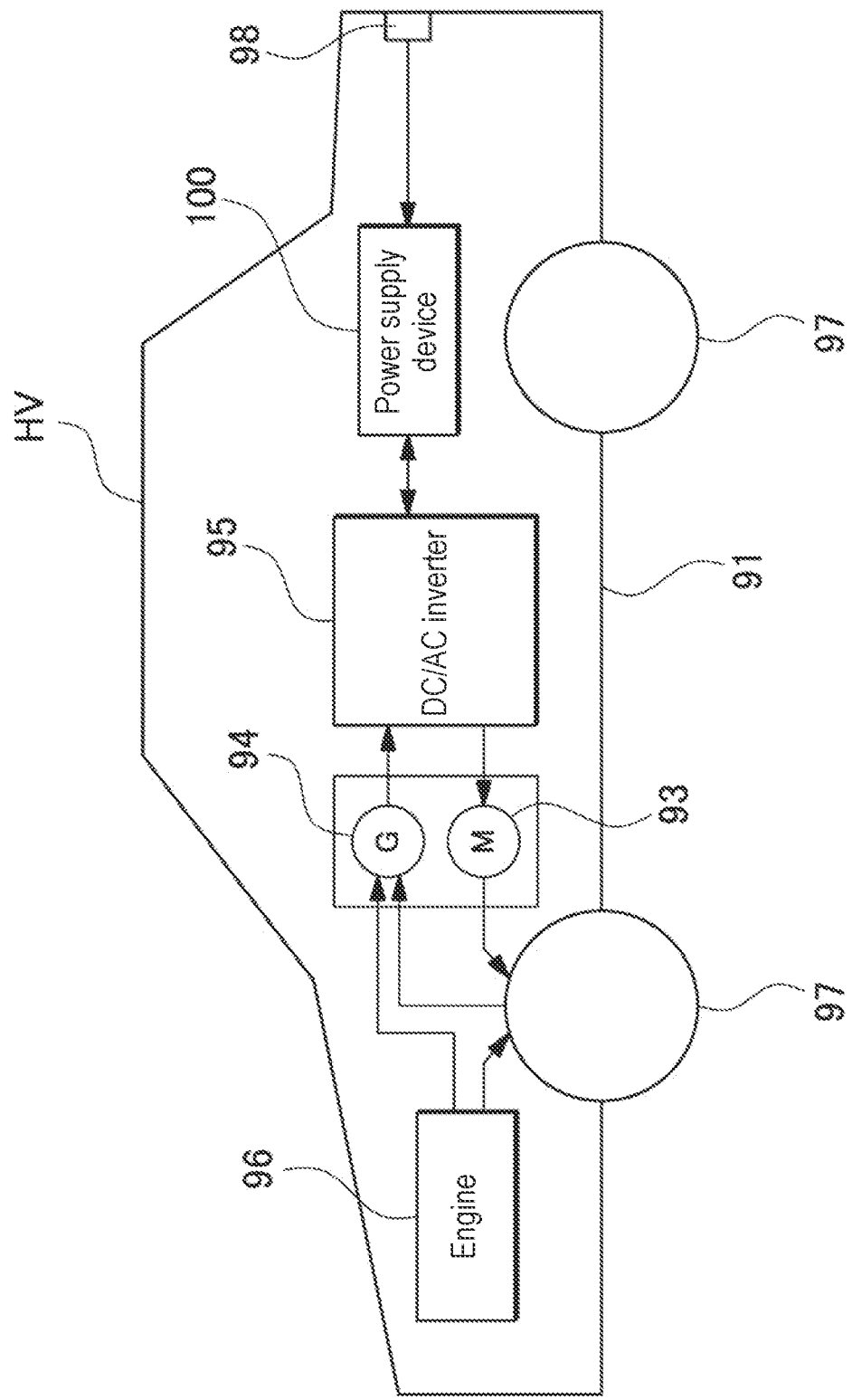
FIG. 12 is a block diagram illustrating an example in which a power supply device is mounted on a hybrid vehicle running on an engine and a motor.

FIG. 12 illustrates an example in which the power supply device is mounted on a hybrid vehicle running on both an engine and a motor. Vehicle HV equipped with the power supply device illustrated in FIG. 12 includes vehicle body 91, engine 96 and running motor 93 on which vehicle body 91 runs, wheels 97 driven by engine 96 and running motor 93, power supply device 100 that supplies electric power to motor 93, and generator 94 that charges the batteries of power supply device 100. Power supply device 100 is connected to motor 93 and generator 94 via DC/AC inverter 95. Vehicle HV runs on both motor 93 and engine 96 while charging and discharging the batteries of power supply device 100. Motor 93 is driven to run the vehicle in a region where the engine efficiency is low, for example, at the time of accelerating or traveling at a low speed. Motor 93 is driven by being supplied with electric power from power supply device 100. Generator 94 is driven by engine 96 or by regenerative braking upon braking of the vehicle to charge the batteries of power supply device 100. As illustrated in FIG. 12, vehicle HV may be provided with charging plug 98 for charging power supply device 100. By connecting charging plug 98 to an external power supply, power supply device 100 can be charged.

(Power Supply Device for Electric Vehicle)

Figure 13:
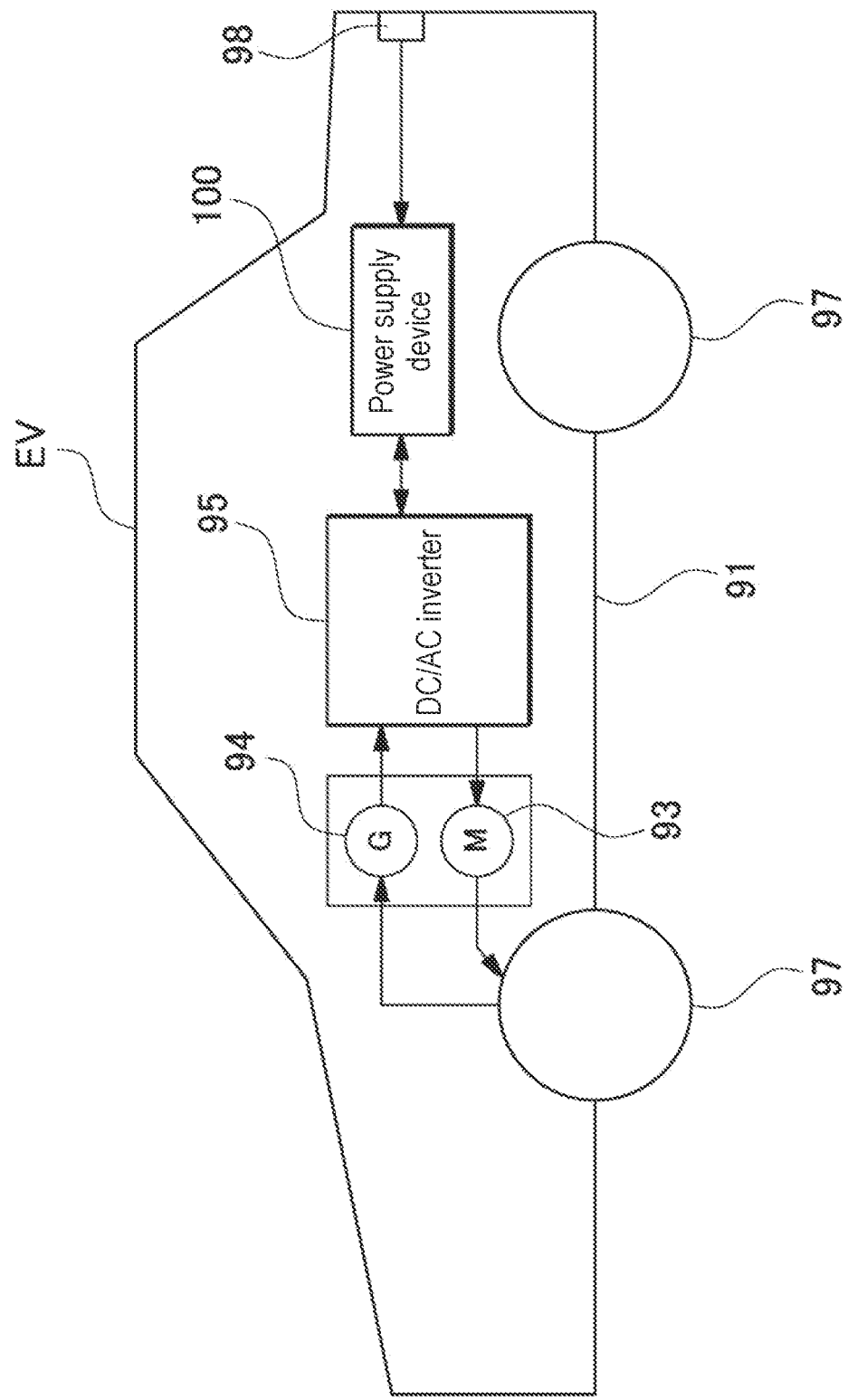
FIG. 13 is a block diagram illustrating an example in which a power supply device is mounted on an electric vehicle running only by a motor.

FIG. 13 illustrates an example in which the power supply device is mounted on an electric vehicle that travels only on a motor. Vehicle EV equipped with the power supply device illustrated in FIG. 13 includes vehicle body 91, running motor 93 on which vehicle body 91 runs, wheels 97 driven by running motor 93, power supply device 100 that supplies electric power to motor 93, and generator 94 that charges the batteries of power supply device 100. Power supply device 100 is connected to motor 93 and generator 94 via DC/AC inverter 95. Motor 93 is driven by being supplied with electric power from power supply device 100. Generator 94 is driven by the energy used for regenerative braking of vehicle EV to charge the batteries of power supply device 100. In addition, vehicle EV is equipped with charging plug 98. Power supply device 100 can be charged by connecting charging plug 98 to an external power supply.

(Electric Storage System)

Figure 14:
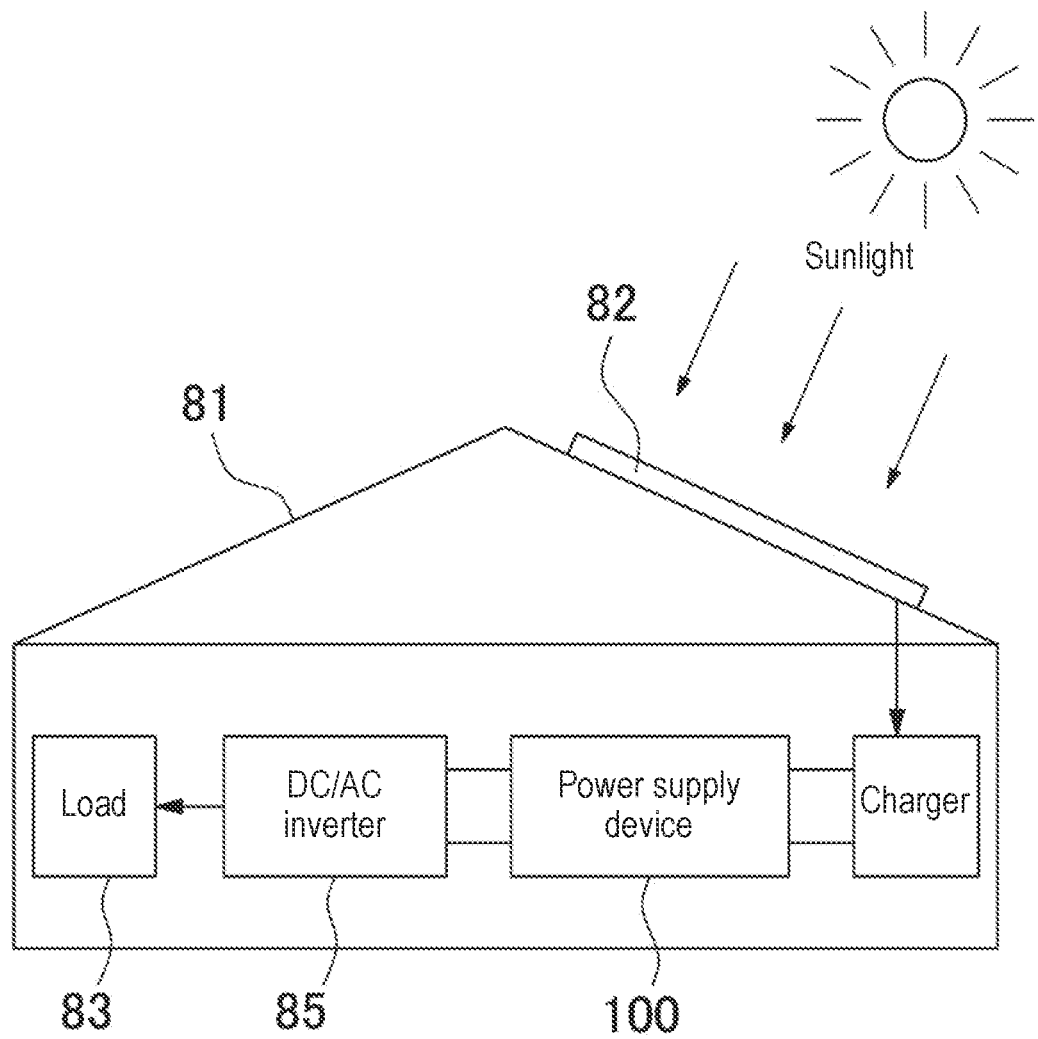
FIG. 14 is a block diagram illustrating an example applied to a power supply device for storing electricity.

The present invention does not specify the use of the power supply device as the power supply of the motor that runs the vehicle. The power supply device according to each exemplary embodiment can also be used as a power supply for an electric storage system that charges and stores electricity in batteries with electric power generated by solar power generation, wind power generation, or the like. FIG. 14 illustrates an electric storage system in which the batteries of power supply device 100 are charged by solar cells to store electricity. As illustrated in FIG. 14, the electric storage system illustrated in FIG. 14 charges the batteries of power supply device 100 with electric power generated by solar cell 82 disposed on the roof or roof terrace of building 81 such as a house or factory. Furthermore, this electric storage system supplies the power stored in power supply device 100 to load 83 via DC/AC inverter 85.

Although not illustrated, the power supply device can also be used as the power supply of an electric storage system that charges and stores electricity in a battery by using midnight power at night. The power supply device that is charged with midnight power can be charged with midnight power that is the surplus power of a power plant, outputs power during the daytime when the power load increases, and limits the peak power during the daytime to a small value. The power supply device can also be used as a power supply that is charged with both the output of a solar cell and midnight power. This power supply device can effectively store both electric power generated by a solar cell and midnight electric power, and can efficiently store electricity in consideration of weather and power consumption.

The electric storage system as described above can be suitably used for applications such as a backup power supply device that can be installed in the rack of a computer server, a backup power supply device for a wireless base station for mobile phones or the like, an electric storage power supply for a home or a factory, a street light power supply or the like, an electric storage device combined with a solar cell, and a backup power supply for traffic lights and traffic indicators for roads.

INDUSTRIAL APPLICABILITY

The power supply device and the vehicle provided with the power supply device according to the present invention can be suitably used as a power supply for a large current used for the power supply of a motor for driving an electrically driven vehicle such as a hybrid vehicle, a fuel cell vehicle, an electric vehicle, or an electric motorcycle. For example, the above devices include a power supply device for a plug-in hybrid electric vehicle and a hybrid electric vehicle that can switch between the EV running mode and the HEV running mode, and an electric vehicle. The above devices can be used as appropriate for applications such as a backup power supply device that can be installed in the rack of a computer server, a backup power supply device for a wireless base station for mobile phones or the like, an electric storage power supply for a home or a factory, a street light power supply or the like, an electric storage device combined with a solar cell, and a backup power supply for traffic lights.

REFERENCE MARKS IN THE DRAWINGS

100, 700 power supply device
1 secondary battery cell
1X terminal surface
1*a* package can
1*b* sealing plate
2 electrode terminal
3 bus bar
10 battery stack
20, 20B, 20C, 20D, 20E, 20F, 20G end plate
21 pipe portion
22 pipe hole
23, 23', 23E, 23G plate portion
24 first plate
25 second plate
26 recess
30 fastening member
32 through hole 40 flange bolt
42 press-fit pin
81 building
82 solar cell
83 load
85 DC/AC inverter
91 vehicle body
93 motor
94 generator
95 DC/AC inverter
96 engine
97 wheel
98 charging plug
900 power supply device
901 secondary battery cell
920 end plate
930 bind bar
HV vehicle
EV vehicle

The invention claimed is:

1. A power supply device comprising:
a plurality of secondary battery cells each having a flat rectangular parallelepiped shape; a pair of end plates covering both end faces of a battery stack having the plurality of secondary battery cells stacked on each other; and
a plurality of fastening members configured to fasten the end plates to each other, wherein
the plurality of fastening members each have a plate shape extending along a stacking direction of the plurality of secondary battery cells, the plurality of fastening members are respectively disposed on opposite surfaces of the battery stack, and the plurality of fastening members each have a through hole in each of both ends of the plate shape,
each of the pair of end plates includes a pipe portion inserted into the through hole of each of a pair of fastening members among the plurality of fastening members, the pair of fastening members being disposed on opposite surfaces of the battery stack,
each of the plurality of secondary battery cells comprises a package can having an opening and a sealing plate that seals the opening of the package can, and at least one of the plurality of fastening members is disposed on a surface of the sealing plate constituting one of the opposite surfaces of the battery stack.

2. The power supply device according to claim 1, wherein each of the pair of end plates comprises a plate portion having a recess that receives the pipe portion.

3. The power supply device according to claim 1, wherein
the pipe portion has a pipe hole in each of both end edges of the pipe portion, and
the power supply device further includes a flange bolt inserted into the through hole and the pipe hole, the flange bolt having a flange having a larger diameter than the through hole.

4. The power supply device according to claim 1, wherein
the pipe portion has a pipe hole in each of both end edges of the pipe portion, and
the power supply device further includes a press-fit pin press fitted into the through hole and the pipe hole, the press-fit pin having a flange having a larger diameter than the through hole.

5. The power supply device according to claim 2, wherein
the pipe portion has a columnar outer shape, and
the recess is formed in a curved shape in accordance with a side surface of the pipe portion.

6. The power supply device according to claim 2, wherein
the plate portion is formed in a size configured to cover one of the secondary battery cells, and
the recess is formed at each of right and left symmetrical positions of the plate portion.

7. The power supply device according to claim 2, wherein
the plate portion and the pipe portion are welded to each other.

8. A vehicle comprising the power supply device according to claim 1, the vehicle comprising:
the power supply device;
a motor to which power is supplied from the power supply device;
a vehicle body equipped with the power supply device and the motor; and
a wheel that is driven by the motor to drive the vehicle body.

* * * * *